US012456440B2

(12) United States Patent
Takata et al.

(10) Patent No.: US 12,456,440 B2
(45) Date of Patent: *Oct. 28, 2025

(54) VEHICLE

(71) Applicant: Maxell, Ltd., Kyoto (JP)

(72) Inventors: Hidenori Takata, Kyoto (JP); Nozomu Shimoda, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,368

(22) Filed: Jun. 24, 2024

(65) Prior Publication Data

US 2024/0347023 A1 Oct. 17, 2024

Related U.S. Application Data

(63) Continuation of application No. 17/269,258, filed as application No. PCT/JP2019/020681 on May 24, 2019, now Pat. No. 12,057,091.

(30) Foreign Application Priority Data

Aug. 24, 2018 (JP) .................................. 2018-156871

(51) Int. Cl.
*G09G 5/37* (2006.01)
*B60K 35/10* (2024.01)
(Continued)

(52) U.S. Cl.
CPC ............... *G09G 5/37* (2013.01); *B60K 35/10* (2024.01); *B60K 35/22* (2024.01); *B60K 35/23* (2024.01);
(Continued)

(58) Field of Classification Search
CPC ......... G06T 11/00; G06T 7/246; G06T 11/60; G06T 15/503; G06T 2207/30201;
(Continued)

(56) References Cited

U.S. PATENT DOCUMENTS 10,034,645 B1 * 7/2018 Williams ............. A61B 5/4064
2009/0034874 A1 * 2/2009 Miller ..................... G06T 15/50
382/279

(Continued)

FOREIGN PATENT DOCUMENTS

JP H06-328980 A 11/1994
JP H11-219130 A 8/1999
(Continued)

OTHER PUBLICATIONS

International Search Report and Written Opinion mailed on Jul. 23, 2019, received for PCT Application PCT/JP2019/020681, Filed on May 24, 2019, 11 pages including English Translation.
(Continued)

Primary Examiner — Ming Wu
(74) Attorney, Agent, or Firm — XSENSUS LLP

(57) ABSTRACT

A head-up display device (HUD) includes a sound analysis portion that determines whether a specific alarm is involved in sound signals from microphones 40a to 40d to collect ambient sound around a vehicle. When a specific alarm has been detected as determined by the sound analysis portion, an image display unit displays icons, representing the specific alarm. The specific alarm includes a siren sound given from an emergency vehicle and a horn sound given from a general vehicle and the sound analysis portion analyzes frequency of input sound signals and thereby determines whether the sound is the specific alarm.

11 Claims, 10 Drawing Sheets

(51) Int. Cl.
  *B60K 35/22* (2024.01)
  *B60K 35/23* (2024.01)
  *B60K 35/28* (2024.01)
  *B60K 35/50* (2024.01)
  *B60K 35/80* (2024.01)
  *B60K 35/90* (2024.01)
  *G02B 27/01* (2006.01)
  *G08G 1/16* (2006.01)
  *G09G 3/00* (2006.01)
  *G10L 25/51* (2013.01)
  *H04R 1/08* (2006.01)
  *H04R 1/40* (2006.01)
  *H04R 3/00* (2006.01)

(52) U.S. Cl.
  CPC .............. *B60K 35/50* (2024.01); *B60K 35/80* (2024.01); *B60K 35/90* (2024.01); *G02B 27/0101* (2013.01); *G09G 3/001* (2013.01); *G10L 25/51* (2013.01); *H04R 1/08* (2013.01); *H04R 1/406* (2013.01); *H04R 3/005* (2013.01); *B60K 35/28* (2024.01); *B60K 2360/166* (2024.01); *B60K 2360/167* (2024.01); *B60K 2360/176* (2024.01); *B60K 2360/178* (2024.01); *G02B 2027/0141* (2013.01); *G08G 1/16* (2013.01); *G09G 2354/00* (2013.01); *G09G 2380/10* (2013.01); *H04R 2201/401* (2013.01); *H04R 2499/13* (2013.01)

(58) Field of Classification Search
  CPC . G06T 2207/30256; G06T 2207/30268; G06T 7/70
  See application file for complete search history.

(56) References Cited

U.S. PATENT DOCUMENTS

| | | | |
|---|---|---|---|
| 2014/0310739 A1 | 10/2014 | Ricci et al. | |
| 2016/0045827 A1* | 2/2016 | Moya | A63F 13/335 |
| | | | 345/582 |
| 2016/0183794 A1* | 6/2016 | Gannon | G01K 1/024 |
| | | | 600/549 |
| 2016/0187654 A1 | 6/2016 | Border et al. | |
| 2017/0263043 A1* | 9/2017 | Peterson | G06T 15/06 |
| 2018/0000441 A1* | 1/2018 | Wang | G06F 18/214 |
| 2018/0165854 A1* | 6/2018 | Du | G06F 16/00 |
| 2018/0239152 A1 | 8/2018 | Kuo et al. | |
| 2018/0280813 A1* | 10/2018 | Huang | F16K 31/44 |
| 2018/0332204 A1* | 11/2018 | Chien | H04N 7/186 |
| 2018/0356630 A1 | 12/2018 | Masuya | |
| 2019/0392267 A1* | 12/2019 | Tang | G06V 30/194 |

FOREIGN PATENT DOCUMENTS

| | | |
|---|---|---|
| JP | 2006-015803 A | 1/2006 |
| JP | 2010-067165 A | 3/2010 |
| JP | 2016-139881 A | 8/2016 |
| JP | 2017-215816 A | 12/2017 |
| WO | 2017/090464 A1 | 6/2017 |
| WO | 2018/055232 A1 | 3/2018 |

OTHER PUBLICATIONS

Japanese Notice of Rejection issued Aug. 31, 2021, in corresponding Japanese Patent Application No. 2020-538181, 5 pp.
Notice of Reasons for Refusal issued for the corresponding Japanese patent application No. 2020-538181, dated Apr. 26, 2022.

* cited by examiner

F I G. 5

SPECIFICATIONS OF ALARMS

| ALARM TYPE | | FREQUENCY | BPF2 PASSBAND SETTING EXAMPLE | PERIOD | SOUND VOLUME |
|---|---|---|---|---|---|
| EMERGENCY VEHICLE (SIREN SOUND) | AMBULANCE | 960Hz (HIGH TONE) / 770Hz (LOW TONE) WITH VIBRATO (±10Hz) | 700 - 1000Hz ($= fx$) | 0.65sec (HIGH TONE) / 0.65sec (LOW TONE) | 90 - 120 dB AT 20 m AHEAD OF VEHICLE |
| | FIRE TRUCK | APPROX. 400Hz ~ 850Hz | | 4sec (SOUNDING) / 2sec (SILENT) | DITTO |
| | POLICE CAR | APPROX. 870Hz ± 50Hz | | 8sec (or 4sec) | DITTO |
| GENERAL VEHICLE (HORN SOUND) | | 500Hz / 400Hz | 400 - 500Hz ($= fy$) | NOT SPECIFIED | 93 - 112 dB AT 7 m AHEAD OF VEHICLE |

F I G. 10

(a) PRIORITY FOR OBJECTS TO DISPLAY

| PERSPECTIVE | PRIORITY: HIGH | PRIORITY: LOW |
|---|---|---|
| ALARM TYPE | HORN SOUND OF GENERAL VEHICLE | SIREN SOUND OF EMERGENCY VEHICLE |
| SOUND VOLUME OF ALARM (SAME TYPE) | LARGE VOLUME | SMALL VOLUME |
| ALARM OCCURRENCE SITUATIONS (DRIVING CONDITION OF ANOTHER VEHICLE) | ALARM SOUND APPROACHING OWN VEHICLE | ALARM SOUND GOING WAY FROM OWN VEHICLE |
| | HIGH SPEED DRIVING | LOW SPEED DRIVING |

(b) PRIORITY AGAINST OTHER DISPLAY FUNCTIONS

| PERSPECTIVE | PRIORITY: HIGH | PRIORITY: LOW |
|---|---|---|
| DRIVING CONDITION OF OWN VEHICLE | DRIVING | STOPPING |
| ALARM DETECTION CONDITION | DETECTING ALARM (SOUND VOLUME IS AT OR ABOVE PREDETERMINED LEVEL) | NOT DETECTING ALARM (SOUND VOLUME IS LESS THAN PREDETERMINED LEVEL) |
| HEARING OF DRIVER | PERSON WITH HEARING LOSS | PERSON WITH NORMAL HEARING |
| VEHICLE INTERIOR ENVIRONMENT | VEHICLE INTERIOR SOUND (SUCH AS MUSIC) IS LOUD | VEHICLE INTERIOR SOUND IS SMALL |

VEHICLE

CROSS-REFERENCE TO RELATED APPLICATIONS

The present application is a continuation of U.S. application Ser. No. 17/269,258, filed Feb. 18, 2021, which is based on PCT filing PCT/JP2019/020681, filed May 24, 2019, which claims priority to JP 2018-156871, filed Aug. 24, 2018, the entire contents of each are incorporated herein by reference.

TECHNICAL FIELD

The present invention relates to a head-up display device that is mounted in a vehicle to display information on ambient sound.

BACKGROUND ART

As one of technologies for displaying an image so as to be superimposed on actual space, an image display unit for vehicles that displays a variety of information on the windshield of a vehicle (a so-called head-up display device (hereinafter referred to as an HUD)) has recently been put into practical use. By providing information intended for drivers as visible information that is displayed by this device, it is possible to assist vehicle driving operations.

Meanwhile, a technology that converts sound produced by a speaker to visible information and displays the visible information is known. For example, in PTL1, a display device (HUD) is disclosed that generates an image signal corresponding to a result of recognizing sound or a sound signal that is output from an information providing device (a vehicle navigation device) and displays an image corresponding to the generated image signal.

CITATION LIST

Patent Literature

PTL 1: Japanese Patent Application Laid-Open No. Hei 11-219130

SUMMARY OF INVENTION

Technical Problem

When one is driving a vehicle with its windows shut up, ambient sound outside the vehicle becomes hard to hear for the driver. For instance, if the driver cannot hear an alarm (siren sound) from an emergency vehicle or an alarm (horn sound) from a nearby driving vehicle, this situation could constitute an obstruction to safe driving.

Especially, when a driver or passenger hears a loud sound of music or the like produced by an in-vehicle speaker, or if a driver is a hearing-impaired person, ambient sound becomes harder to hear. Such circumstances where one who is driving a vehicle can hardly hear ambient sound outside the vehicle have not often been taken as a problem in the past. The technology of PTL 1 mentioned above converts sound information generated by a vehicle navigation device in the vehicle to an image and displays the image; however, it does not cover visualizing an alarm outside the vehicle.

An object of the present invention is to provide a head-up display device that displays an alarm sound or the like as visible information to a driver in circumstances where one who is driving a vehicle can hardly hear ambient sound outside the vehicle.

Solution to Problem

To solve the above-noted problem, a head-up display device according to the present invention includes a sound analysis portion that takes input of sound signals from microphones set in place on the vehicle to collect ambient sound around the vehicle and determines whether a specific alarm is involved in the sound signals, an image display unit that generates an image that is projected, and a control unit that controls the sound analysis portion and the image display unit. When a specific alarm has been detected as determined by the sound analysis portion, the control unit causes the image display unit to display an icon representing the detected specific alarm additionally on an image that is projected. Here, the specific alarm includes a siren sound given from an emergency vehicle, and a horn sound given from a general vehicle and the sound analysis portion analyzes frequency of input sound signals and thereby determines whether the sound is the specific alarm.

Advantageous Effects of Invention

According to the present invention, even in circumstances where one who is driving a vehicle can hardly hear ambient sound outside the vehicle, it is possible to make the driver aware of an alarm from an emergency vehicle among others as visible information and the present invention has an advantageous effect of contributing to safe driving.

BRIEF DESCRIPTION OF DRAWINGS

FIG. 5 is a diagram illustrating a table of specifications of diverse alarms.

FIG. 10 is a diagram presenting examples of priority setting for alarm display.

DESCRIPTION OF EMBODIMENTS

An embodiment of a head-up display device (hereinafter referred to as an HUD) according to the present invention is described with the aid of the drawings.

Figure 1:
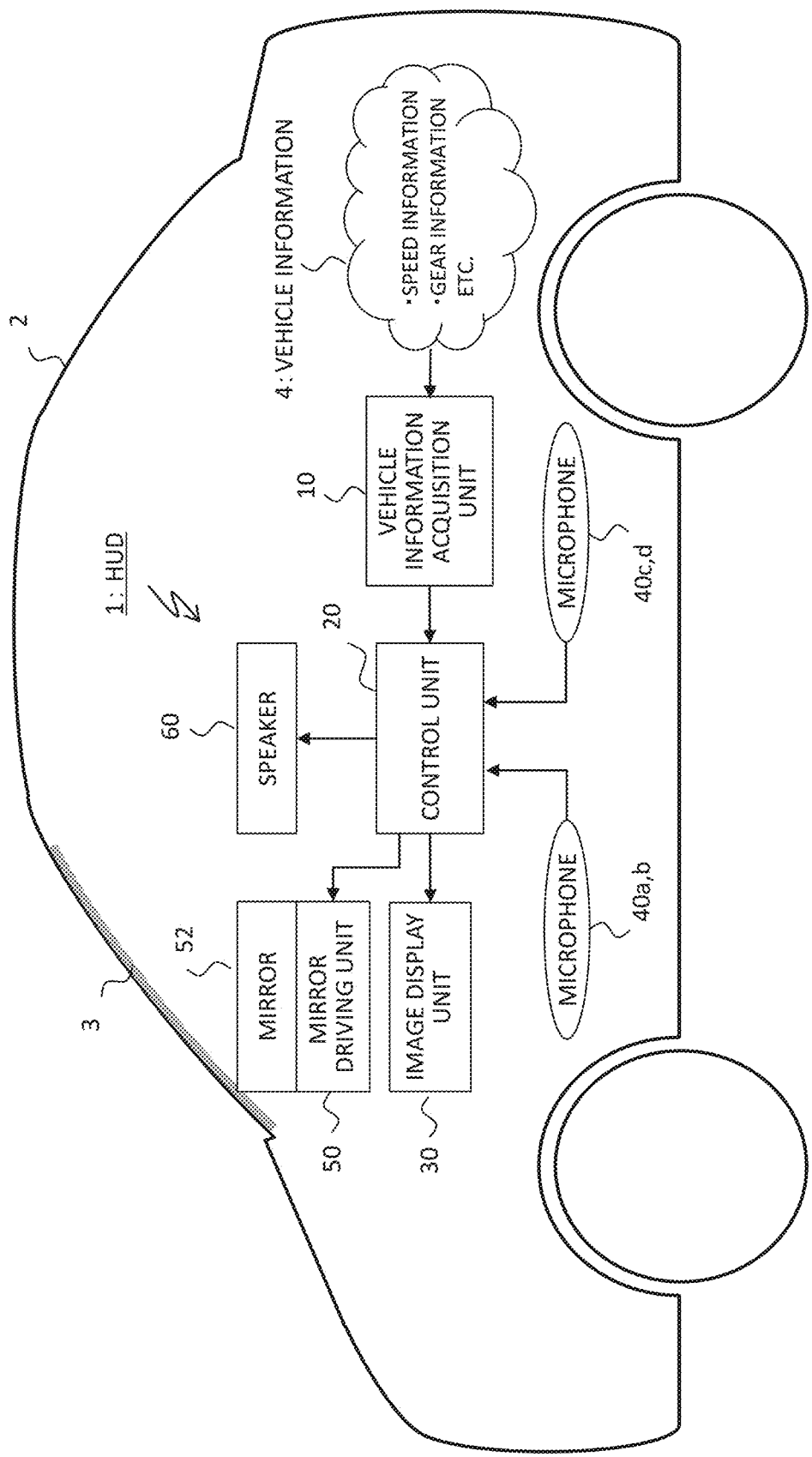
FIG. 1 is a diagram depicting an overview of a head-up display device (HUD) mounted in a vehicle.

FIG. 1 is a diagram depicting an overview of the HUD mounted in a vehicle. The HUD 1 is mounted in a vehicle 2 and projects an image generated by an image display unit 30 on the windshield 3 of the vehicle 2 through a mirror 52. The image reflected by the windshield 3 enters the eyes of a driver and the driver can view the image. Information related to driving (information on the own vehicle and information from another vehicle) is included in the displayed image and is useful for assisting driving operations. In this embodiment, the HUD also has a function of displaying visible information (an icon) indicating an alarm upon detecting a siren sound from an emergency vehicle or a horn sound from a nearby driving vehicle.

The HUD 1 internally includes a vehicle information acquisition unit 10 which acquires a variety of vehicle information 4, a control unit 20 which generates visible information to be displayed based on the vehicle information, a mirror driving unit 50 which drives the mirror 52, multiple microphones 40a to 40d which collect ambient sound around the vehicle, and a speaker 60 which outputs sound information to the driver. Note that the microphones 40a to 40d may be externally attached to the HUD 1. The vehicle information 4 includes steering angle information of the steering wheel, visible information captured by in-vehicle/outside cameras, GPS (Global Positioning System) information, navigation information, etc. in addition to speed information and gear information indicating an operating state of the own vehicle.

Figure 2:
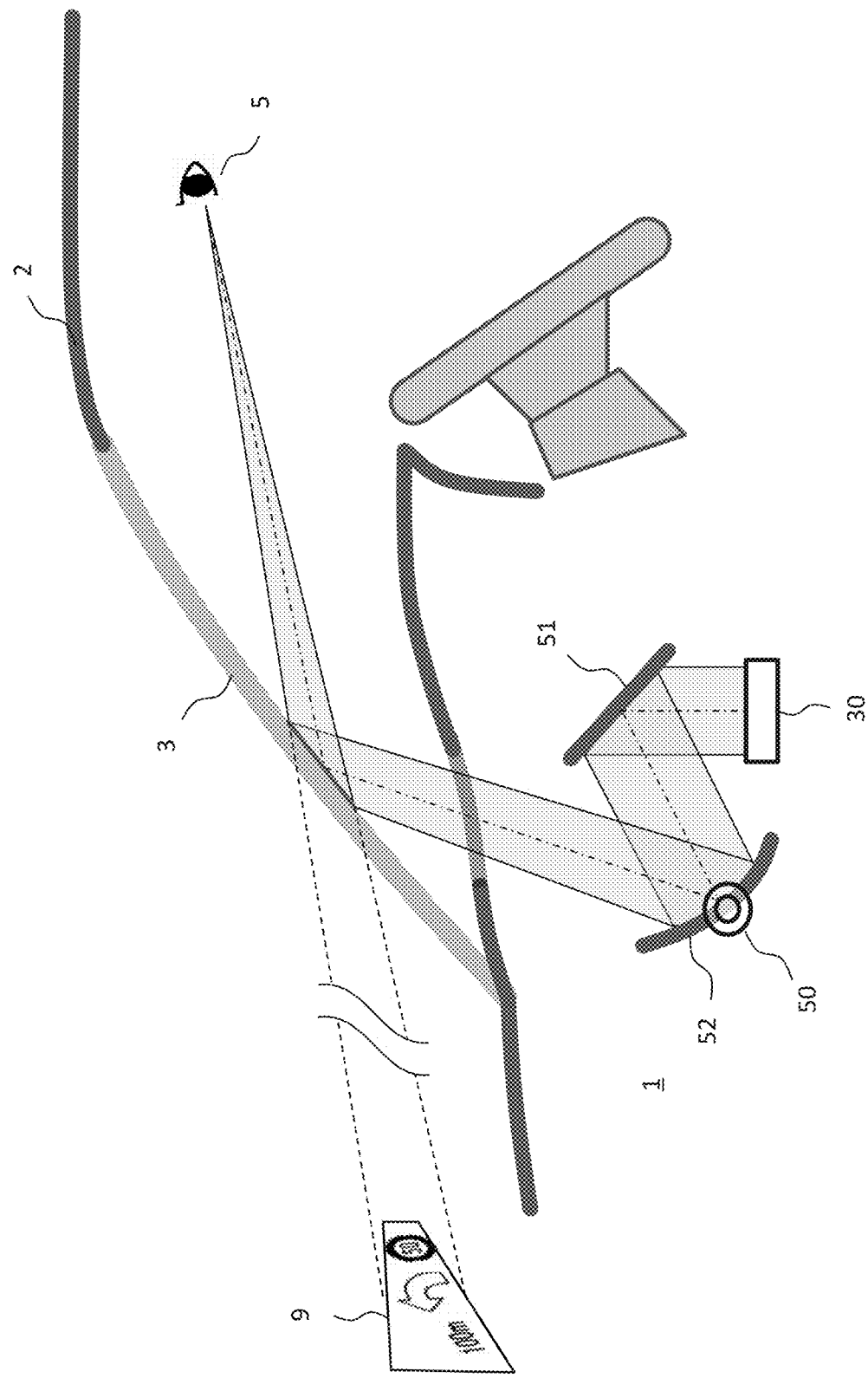
FIG. 2 is a diagram illustrating an image display operation by the HUD.

FIG. 2 is a diagram illustrating an image display operation by the HUD 1. An image for display is emitted from the image display unit 30 installed in a lower part of the dashboard of the vehicle 2. The image is reflected by a first mirror 51 and a second mirror 52 and projected toward the windshield 3. The first mirror 51 is fixed and the second mirror 52 is adapted to be rotatable by the mirror 52.

The image converged and projected from the mirror 52 is reflected by the windshield 3 and enters the eyes 5 of the driver, and the image is focused on the retina so that the driver can view the image. At this point of time, the driver will view a virtual image 9 appearing in front of the windshield 3. Here, the mirror driving unit 50 adjusts the display position of the virtual image 9 depending on the height of the driver's eyes. That is, by rotating the axis of the mirror 52 by the mirror driving unit 50, the position of the virtual image 9 is caused to move up and down, so that the driver can view the virtual image 9 set in a position where it is easy to view.

Figure 3:
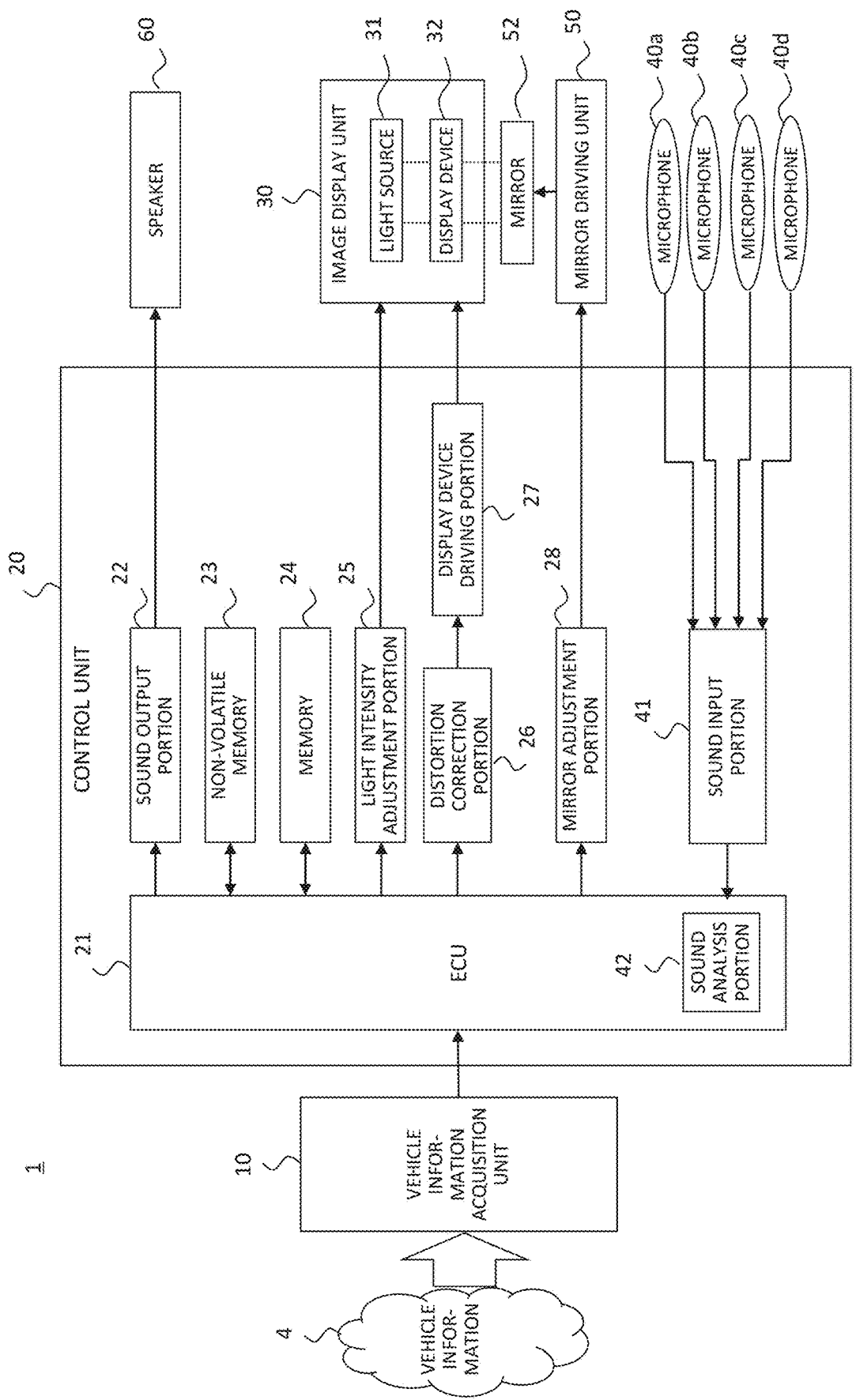
FIG. 3 is a block diagram depicting a configuration of a control system of the HUD.

FIG. 3 is a block diagram depicting a configuration of a control system of the HUD 1. A variety of vehicle information 4 is input to the vehicle information acquisition unit 10 and sent to the control unit 20. An Electronic Control Unit (ECU) 21 in the control unit 20 generates image signals (content to display and an icon to display) that the HUD 1 will display based on the input vehicle information 4 and various control signals for the HUD 1. A sound output portion 22 generates sound signals to a speaker 60. A non-volatile memory 23 stores programs to be executed by the ECU 21 and a memory 24 stores visible information and control information.

The image display unit 30 is comprised of a light source 31 such as LED or laser, lighting optics (not depicted, and a display device 32 such as a liquid crystal device, and emits image light generated by the display device 32 toward the mirror 52.

A light intensity adjustment portion 25 in the control unit 20 controls the light source 31 in the image display unit 30. A distortion correction portion 26 corrects distortions of image signals to be displayed and a display device driving portion 27 drives the display device 32 in the image display unit 30 based on corrected image signals. A mirror adjustment portion 28 outputs a drive signal to the mirror driving unit 50 to adjust the position and posture of the mirror 52.

A sound input portion 41 takes input of sound signals from the multiple microphones 40a to 40d set in place on the vehicle and sends these signals to a sound analysis portion 42 in the ECU 21. The sound analysis portion 42 analyzes sound signals input to it and determines whether there is a sound of an alarm of a specific type and which direction the alarm sound comes from. Then, depending on the result of determination by the sound analysis portion 42, the ECU 21 generates an icon to display corresponding to an alarm and causes the image display unit 30 to display the icon additionally. Details on the sound analysis portion 42 and concrete examples of icons to display will be described later.

Note that the sound analysis portion 42 depicted as included in the ECU 21 in the configuration in FIG. 3 may be set up independently in the control unit 20, separately from the ECU 21. Also, in an alternative configuration, sound signals from the microphones 40a to 40d may be handled as one item of information that is included in the vehicle information 4 and may be input via the vehicle information acquisition unit 10.

Figure 4:
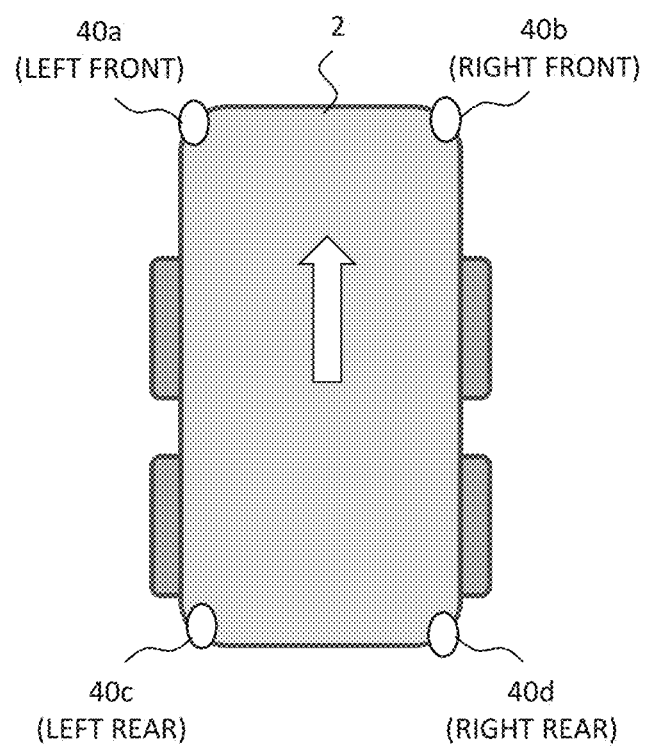
FIG. 4 is diagram illustrating an example of setting up microphones on the external surface of the vehicle.

FIG. 4 is diagram illustrating an example of setting up the microphones on the external surface of the vehicle 2. In this example, four microphones 40a to 40d are installed at four corners of the vehicle 2. The reason is that this setup of the microphones is apt for determining which direction an alarm sound comes from and allows the HUD to distinguish directions: front, back, left and right. That is, by comparing times at which an alarm sound has been input to the four microphones 40a to 40d (or sound volumes), it is enabled to distinguish the directions: front, back, left and right. Note that, a simplified configuration where each one microphone is installed at the front and rear ends of the vehicle respectively, it is possible to distinguish directions: front and back.

FIG. 5 is a diagram illustrating a table of specifications of diverse alarms. While there are diverse ambient sounds during driving, this table first lists alarms (siren sounds) coming from emergency vehicles (an ambulance, a fire truck, and a police car) and describes specifications of the alarm sounds. In each case, the alarm frequency and sounding period are specified by emergency vehicle type. For example, as for the siren sound of the ambulance, sound at frequencies of 960 Hz (high tone) and 770 Hz (low tone) is repeated at a period of 0.65 sec., respectively. Also, the sound volume of each alarm is specified. In this embodiment, not only the siren sounds of emergency vehicles but a horn sound from a general vehicle is to be detected. Because these alarm sounds are at different frequencies, it is enabled to determine an alarm type by identifying the alarm frequency. Note that discrimination is made between an alarm of an emergency vehicle and an alarm of a general vehicle without distinguishing any of the emergency vehicles, ambulance, fire truck, and police car which are treated in the same category. Therefore, assuming that an identifiable frequency range fx of the emergency vehicle alarm is, e.g., 700 to 1000 Hz and an identifiable frequency range fy of the general vehicle alarm is, e.g., 400 to 500 Hz, by setting these frequency ranges as passbands of a band-pass filter (BPF2) 421 which will be described later with FIG. 6, it is possible to determine an alarm type.

Figure 6:
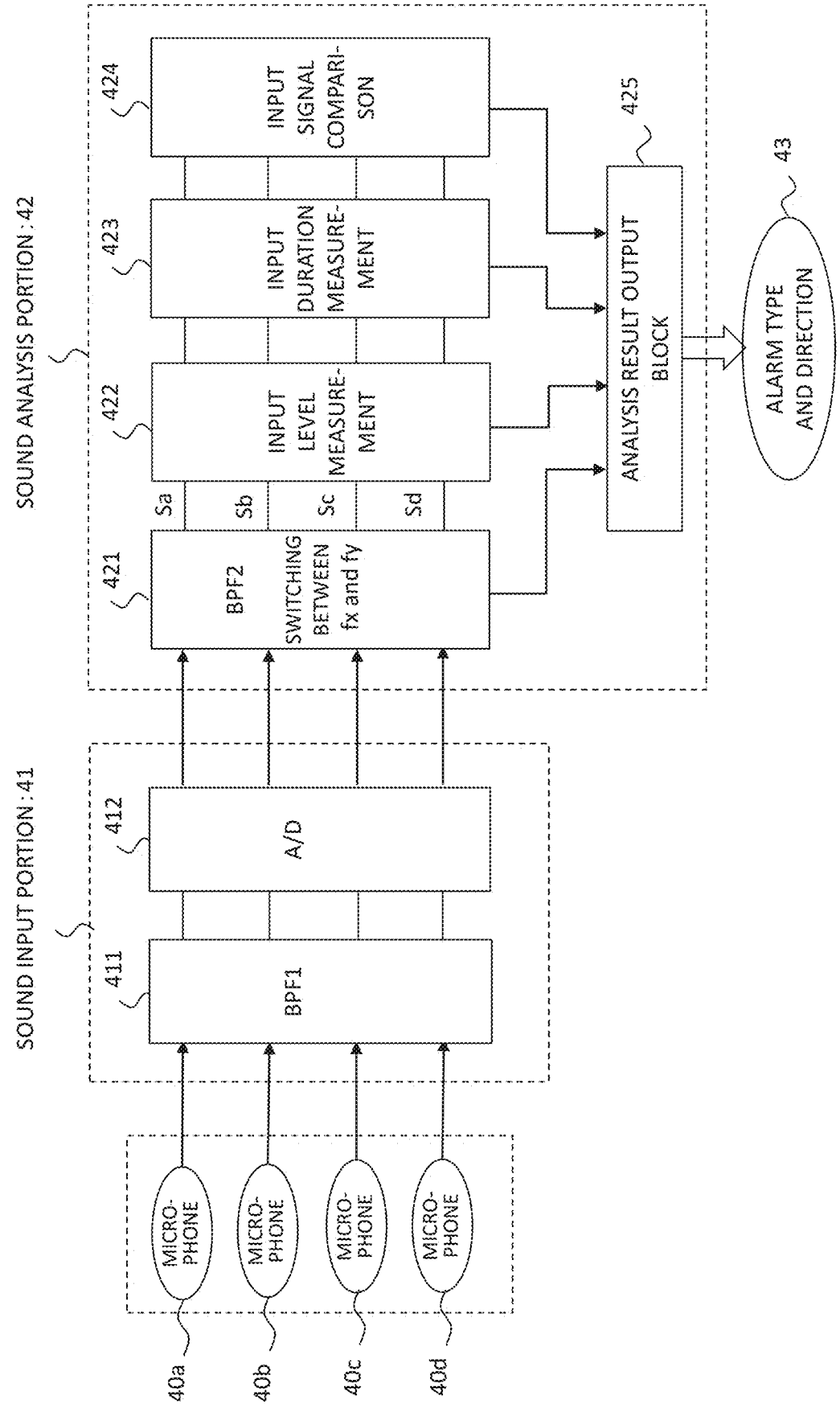
FIG. 6 is a diagram depicting the internal structures of a sound input portion and a sound analysis portion.

FIG. 6 is a diagram depicting the internal structures of the sound input portion 41 and the sound analysis portion 42.

Sound signals from the respective microphones 40a to 40d set in place on the vehicle are input to the sound input portion 41 and a band-pass filter (BPF1) 411 at a first stage cuts off low and high frequency bands and allows an intermediate frequency band (e.g., 400 to 1000 Hz) that encompasses the frequencies of all alarms to pass therethrough. An AD converter 412 converts analog sound signals to digital signals and outputs the digital signals to the sound analysis portion 42.

In the sound analysis portion 42, a band-pass filter (BPF) 421 at a second stage allows signals in alarm-specific frequency bands specified in FIG. 5 to pass therethrough. For example, a passband for the emergency vehicle alarm is set at fx=700 to 1000 Hz f and a passband for the general vehicle alarm is set at fy=400 to 500 Hz and alternately switching between these passbands is performed. In a concrete filtering design, by combining and integrating an LPF and a HPF, it is possible to extract only signals closer to the alarm frequency bands specified in FIG. 5. It is assumed that Sa to Sd denote signals from the respective microphones 40a to 40 that passed through the band-pass filter (BPF2) 421.

An input level measurement block 422 measures the amplitude level of the signals Sa to Sd from the band-pass filter (BPF2) 421. An input duration measurement block 423 measures the duration when the signals Sa to Sd are input from the band-pass filter (BPF2) 421. An input signal comparison block 424 compares times at which signals Sa to Sd have been input from the band-pass filter 421 or the amplitude levels of the signals.

An analysis result output block 425 outputs an analysis result based on processing results from the respective blocks. That is, a determination is made of the alarm type (emergency vehicle or general vehicle alarm) according to which of the filter frequency bands (fx, fy) set as the passbands of the band-pass filter 421 is effective. At this time, signals with amplitude at or above a predetermined value of the amplitude level measured by the input level measurement block 422 are regarded as valid and signals with duration at or above a predetermined length of time of the input duration measured by the input duration measurement block 423 are regarded as valid. Signals whose amplitude level is below the predetermined value or signals whose input duration is below the predetermined length of time are regarded as noise and are not recognized as an alarm. These thresholds are set appropriately depending on driving environment conditions. Then, from a result of comparing the times of signal input or signal amplitude levels by the input signal comparison block 424, it is determined that the direction of a microphone by which a signal was detected at the earliest time or a signal with the largest amplitude was detected corresponds to a direction of the alarm. For example, when a signal Sb was detected at the earliest time, it is determined that the alarm comes from a direction corresponding to the direction of a microphone 40b, i.e., from the right front of the vehicle moving. This analysis result 43 is sent to the ECU 21 and the ECU 21 generates an icon to display corresponding to the alarm type and direction.

Figure 7:
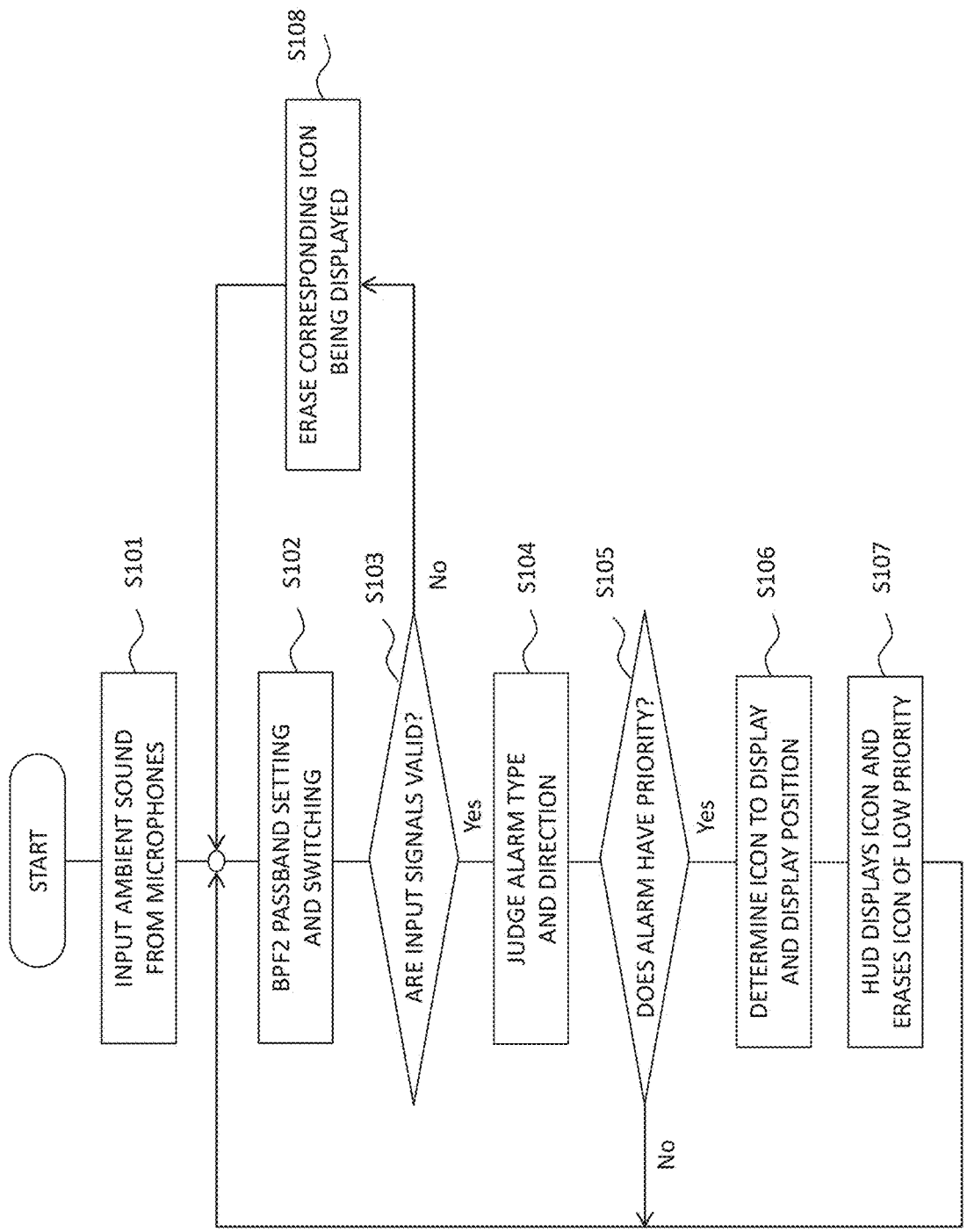
FIG. 7 is a flowchart illustrating alarm detection and icon display control.

FIG. 7 is a flowchart illustrating alarm detection and icon display control. The ECU 21 in the control unit 20 controls the sound analysis portion 42 to carry out processing described below.

S101: Ambient sound signals are input from the four microphones 40a to 40d set in place on the vehicle via the sound input portion 41.

S102: Passband frequencies of the BPF2 (421) in the sound analysis portion 42 are set at the identifiable frequency ranges. Alternately switching between these frequency ranges, e.g., fx for the emergency vehicle alarm and fy for the general vehicle alarm in FIG. 5 is performed.

S103: A determination is made as to whether or not input signals from the respective microphones that passed through the BPF2 are valid. In the determination, signals with amplitude at or above a predetermined value of the amplitude level measured by the input level measurement block 422 and signals with duration at or above a predetermined length of time of the input duration measured by the input duration measurement block 423 are regarded as valid. If the signals are determined to be invalid by each criterion, the processing proceeds to S108; then, if the icon of an alarm corresponding to either of the passband frequencies of the BPF2 set at S102 is being displayed already, that icon is erased. Then, the processing returns to S102 and switching of passband frequency of the BPF2 is performed.

S104: If the input signals from the respective microphones are valid, a judgement is made of the alarm type and direction. The alarm type is judged from which of the passband frequencies of the BPF2 set at S102 is effective. The alarm direction is judged from a result of comparing the times of input or the amplitude levels of the respective input signals by the input signal comparison block 424.

S105: The ECU 21 determines whether or not, inter alia, the alarm type judged at S104 has priority over the alarm being displayed now. When priority is set for alarm type and others, as will be described later with FIG. 10, it is judged whether or not displaying is enabled according to the priority setting. If the alarm type determined has lower priority than the alarm being displayed now, the processing returns to S102 without displaying it.

S106: If the alarm type determined has priority or if no priority is set and multiple alarms are permitted to be displayed, an icon to display and its display position are determined depending on the detected alarm type and direction. Examples of displaying icons will be described later with FIG. 8 and FIG. 9.

S107: The ECU 21 supplies image signals of an icon to display to the display device driving portion 27 and thereby the HUD 1 displays the icon corresponding to the detected alarm. At this time, the HUD 1 erases the icon of the alarm of low priority being displayed now. After that, the processing returns to S102 and the above steps are repeated.

According to the above flow, upon detecting an alarm sound, the HUD can display the icon corresponding to the alarm type in accordance with its priority, so that the driver can recognize the direction of the sound source. When the HUD is no longer detecting the alarm sound, it can erase the corresponding icon.

Figure 8:
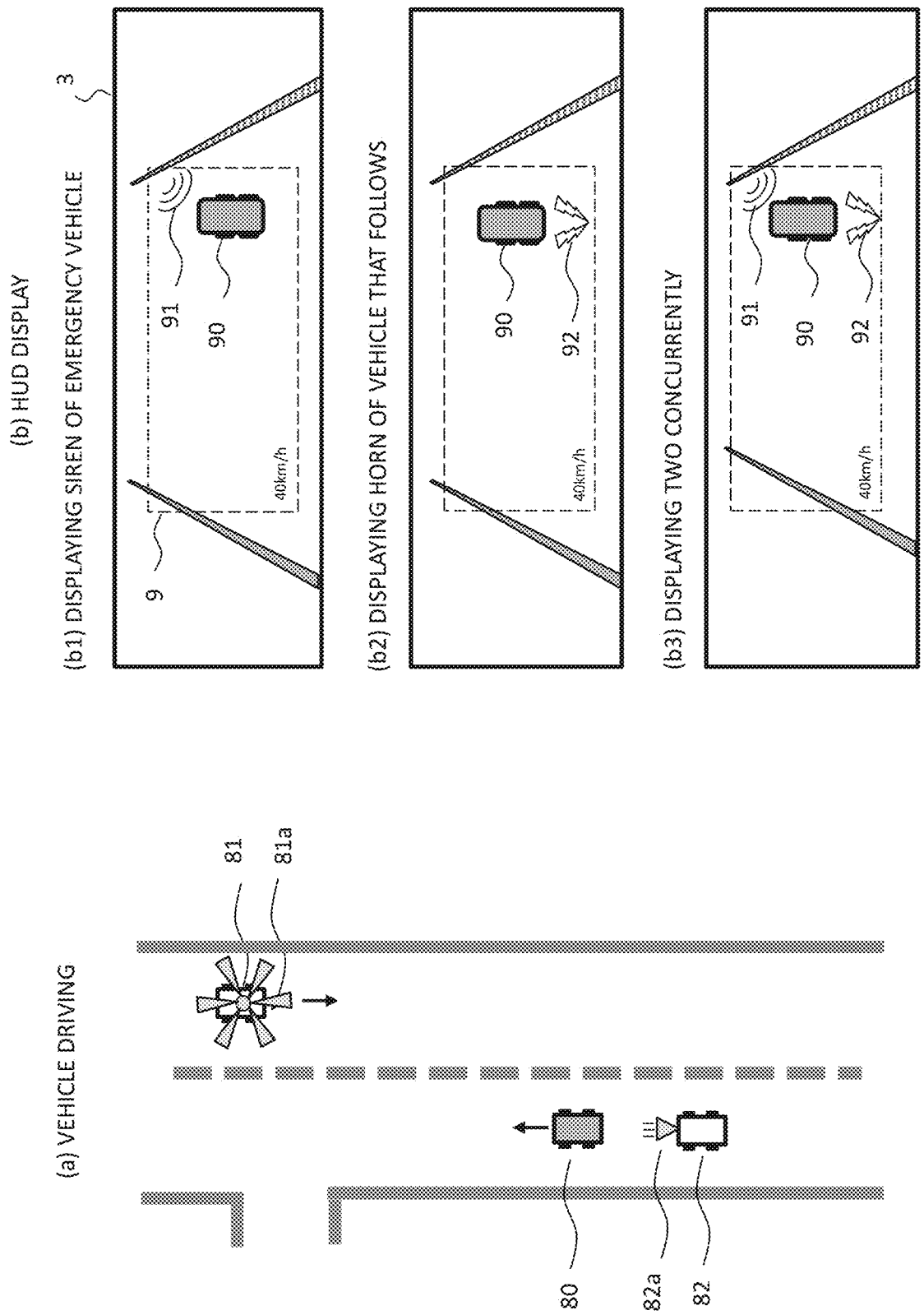
FIG. 8 is a diagram illustrating examples of displaying icons of alarms.

FIG. 8 is a diagram illustrating examples of displaying icons of alarms.

(a) illustrates vehicle driving on a road and a vehicle 80 operated by the driver runs in an arrow direction. At this time, the drawing illustrates a situation in which an emergency vehicle 81 giving a siren sound 81a approaches from the front in an oncoming lane or the driver is alerted by a horn sound 82a from a vehicle 82 that follows. The HUD 1 mounted in the vehicle 80 operated by the driver, upon detecting these alarms, visualizes the fact that it has received the alarms and displays them with icons.

(b) illustrates examples of displaying icons of alarms by the HUD 1 and an icon that represents an alarm is displayed additionally on a virtual image 9 that the driver views via the windshield 3. Here, three cases of display are illustrated.

(b1) illustrates a case where an icon 91 that represents the siren sound received from the emergency vehicle 81 is displayed in addition to an icon 90 that represents the own vehicle. At this time, as for the display position of the icon 91, the icon is displayed right forward with respect to the icon 90 of the own vehicle; the siren sound has been detected in this direction.

(b2) illustrates a case where an icon 92 that represents the horn sound received from the vehicle 82 that follows is displayed with the icon 90 that represents the own vehicle. As for the display position of the icon 92, the icon is displayed rearward with respect to the icon 90 of the own vehicle; the horn sound has been detected in this direction. Note that different marks are used for the icon 91 representing the siren sound and the icon 92 representing the horn sound to inform the driver of an alarm event, allowing the driver to discriminate between the types of alarms.

(b3) illustrates a case where these two icons are displayed concurrently, when the HUD has concurrently received the siren sound from the emergency vehicle 81 and the horn sound from the vehicle 82 that follows. Both the icon 91 representing the siren sound and the icon 92 representing the horn sound are simultaneously displayed forward and rearward with respect to the icon 90 of the own vehicle.

When an alarm is involved in ambient sound around the own vehicle, the fact that the alarm has been received is visually displayed by the HUD 1 in the manner illustrated above and therefore, even in circumstances where the driver can hardly hear ambient sound, the driver can easily know the presence of the alarm. In FIG. 8(*b*), the icons 91 and 92 of the alarms are displayed in distinct positions with respect to the icon 90 representing the own vehicle to pass on a direction in which there is the source of an alarm sound and, therefore, the driver can intuitively recognize the direction of the sound source. However, a wide display space is needed, because the icons 91 and 92 of the alarms are displayed together with the icon 90 of the own vehicle. Therefore, a display method simplified as described below is also possible.

Figure 9:
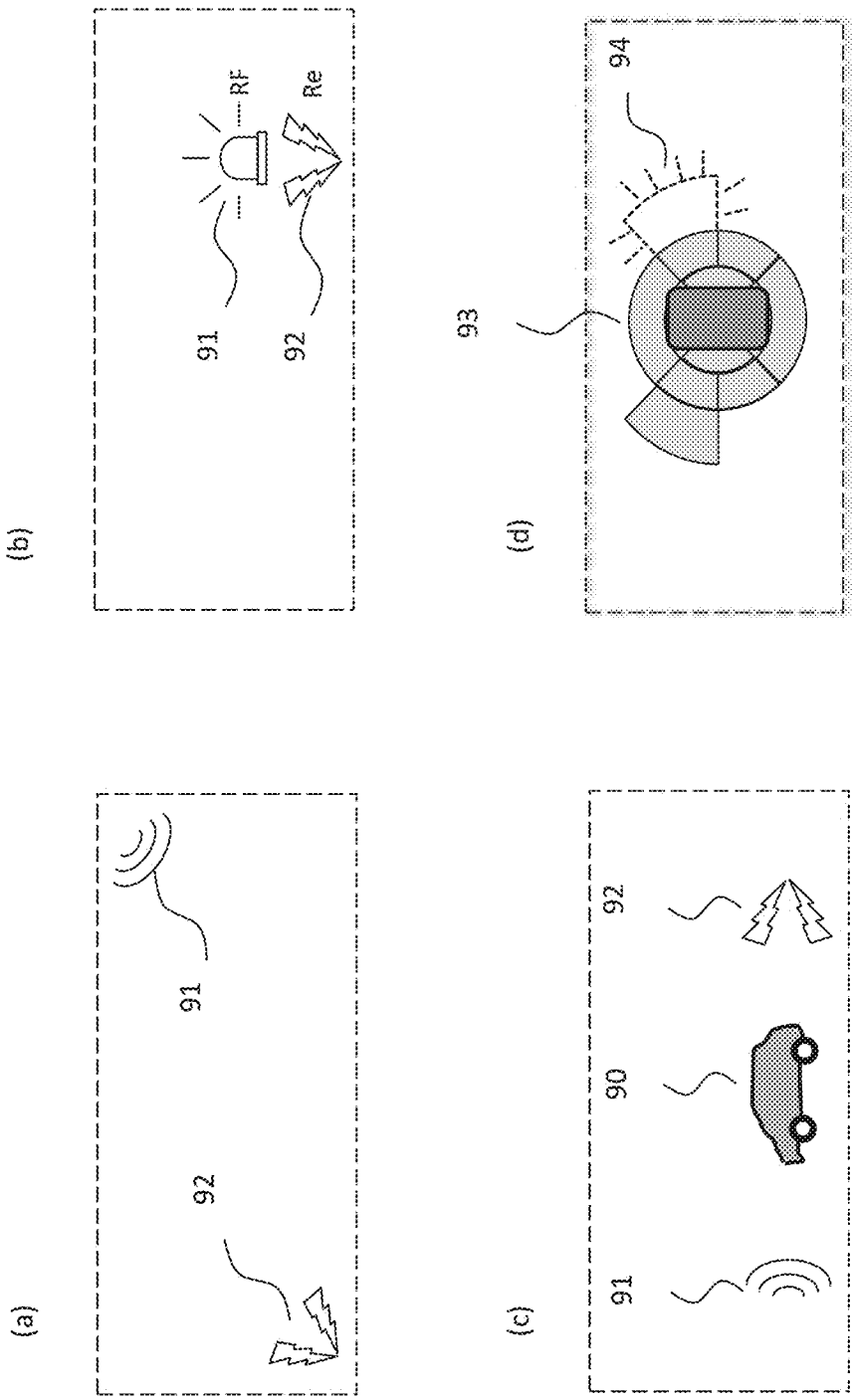
FIG. 9 is a diagram illustrating other examples of displaying icons of alarms.

FIG. 9 is a diagram illustrating other examples of displaying icons of alarms.

(a) illustrates a case where the icons 91 and 92 of the alarms are only displayed, whereas the icon 90 representing the own vehicle is removed. Using the entire display area of the HUD, by displaying the icons 91 and 92 of the alarms in corners of the area, it is possible to pass on the directions of the sound sources of the alarms.

(b) illustrates a case where the icons 91 and 92 of the alarms are displayed in fixed positions and the directions of the sound sources of the alarms are displayed with letters or the like. Directions of the sound sources are represented by combination of letters such as, e.g., F (forward), Re (rearward), Ri (right), and L (left). In this case, because the display positions are fixed, the display space can be saved.

(c) illustrates a case where the icons 91 and 92 of the alarms are displayed with the icon 90 of the own vehicle and forward and rearward directions of the sound sources are only displayed. Also in this case, because the display positions are limited, the display space can be saved.

(d) illustrates a method in which an icon 93 divided into multiple segments corresponding to the directions of the sound sources is displayed beforehand and, when an alarm sound has been detected, a segment 94 corresponding to the direction of the sound source is blinked. According to this method, it is possible to pass on a sense of distance and a direction. As for the alarm types, it is possible to discriminate between them, inter alia, by changing the way of blinking.

Moreover, in (a) to (c), it is also possible to represent a sense of distance by, inter alia, the color and size of the icons 91 and 92 of the alarms. By the simplified icon display method as illustrated above, the driver also can recognize the type of an alarm sound and the direction of the sound source.

Here, a case is considered where multiple alarms' icons are displayed concurrently as in (b3) of FIG. 8 and (a) to (c) of FIG. 9. In these examples, the display positions of the respective icons do not overlap because the HUD receives different alarms (siren and horn sounds) from different directions. Nevertheless, if the directions of the alarms are the same, the display positions of multiple icons overlap and the respective icons become hard to distinguish for the driver, even though they are different marks. Also, even when the directions of the alarms are different, displaying all of multiple icons may make the driver feel intrusive. Therefore, when the HUD has detected multiple alarms (including a case where the alarms are of the same type), it is preferable to determine a rule (priority) as to which alarm should be displayed preferentially and restrict the number of icons to be displayed to one (or within two). Priority setting is described below.

FIG. 10 is a diagram presenting examples of priority setting for alarm display.

(a) presents an example of priority setting for objects to display. That is, (a) illustrates that, when there are multiple alarms that have been detected, which alarm should be displayed preferentially. It is practical to restrict the number of icons to be displayed preferentially to one or within two. This priority setting is, for example, stored in the non-volatile memory 23 beforehand and the ECU refers to it and makes a priority judgment (S105) in the foregoing FIG. 7.

As for the alarm type as a perspective, it is preferable that, basically, priority is given to the horn sound over the siren sound. The reason is that a case where the horn sound is used is a situation where a stringent emergency is at hand or occurs already and, therefore, readiness is needed.

As for the alarm sound volume, priority is naturally given to a larger sound volume (nearer to the vehicle), if the same alarm type has been detected. Note that it is preferable to display the alarm of the siren sound as soon as it is heard even though its sound volume is small, preparing for approaching of the emergency vehicle. Upon detecting the horn sound during display of the siren sound, the HUD should immediately switch to the horn sound display.

As for alarm occurrence situations, priority is given to a situation where another vehicle giving an alarm sound (the alarm sounding vehicle) is approaching the own vehicle over a situation where the other vehicle is going away, taking the driving condition of the other vehicle. In this regard, it can be determined whether the alarm sounding vehicle is approaching or going away by taking advantage of the fact that the receiving frequency of the alarm sound changes by Doppler effect. Alternatively, priority is given to a situation where speed of the alarm sounding vehicle is high over a situation where its speed is low.

(b) presents an example of priority setting for an alarm display function against other display functions. That is, the ECU 21 performs various display functions of the HUD and the priority of the alarm display function in the present embodiment should be changed according to the situation.

In a perspective of driving condition of the own vehicle, driving is set to have high priority over stopping. This is because relative speed to another vehicle increases at driving than at stopping and real-time performance is required.

In a perspective of alarm detection condition, once an alarm sound has been detected, the priority of the alarm display function is set high until its sound volume falls below a predetermined level. Then, adaptive control is desirable to set the priority low when the sound volume has become below the predetermined level (the alarm sound goes away).

Furthermore, as conditions that allow the alarm display function in the present embodiment to be valid, the priority should preferably be set high in a case where the driver is a person with hearing loss and a case where vehicle interior sound (such as music) is loud.

While, in the embodiment described above, as alarms that will be detected, intended ones are the siren sound of an emergency vehicle and the horn sound of a general vehicle, even in a situation where an emergency alert (such as nationwide warning/alert system*) from a source other than vehicles has been detected, the HUD is also capable of displaying its visible information. Additionally, priority setting for multiple alarms, which is described in the foregoing embodiment, is exemplary and it goes without saying that priority can be changed appropriately depending on circumstances.

According to the present embodiment described hereinbefore, when an alarm is involved in ambient sound around the own vehicle, the fact that the alarm has been received is visually displayed by the HUD, and therefore even in circumstances where the driver can hardly hear ambient sound, the driver can easily know the presence of the alarm. In consequence, this contributes to practicing safe driving.

REFERENCE SIGNS LIST

1: head-up display device (HUD),
2: vehicle,
3: windshield,
4: vehicle information,
9: virtual image,
10: vehicle information acquisition unit,
20: control unit,
21: Electronic Control Unit (ECU),
30: image display unit,
40: microphone,
41: sound input portion,
42: sound analysis portion,
90: icon representing the own vehicle,
91, 92, 93: icons representing alarms,
421: band-pass filter (BPF2),
424: input signal comparison block.

The invention claimed is:

1. A vehicle, comprising:
a windshield;
microphones set in place on the vehicle to collect ambient sound around the vehicle;
processing circuitry configured to receive sound signals from the microphones, determine whether the sound signals from the microphone is valid, and determine whether a specific alarm is involved in the sound signals; and
a display configured to generate image light of an image and project the image light toward the windshield of the vehicle, so that a virtual image is displayed in front of the vehicle by reflecting the image light on the windshield, wherein in response to determining that the sound signals from the microphone is valid, and determining that the specific alarm is involved in the sound signals, the processing circuitry adds an icon representing the specific alarm to the virtual image and controls the display to display the virtual image and the icon, in response to determining that the sound signals from the microphone is not valid, in a case where the icon representing the specific alarm involved in the sound signals that have been determined to be not valid is being displayed, the processing circuitry deletes the icon, and the processing circuitry causes the display to display different icons depending on a type of the specific alarm detected.

2. The vehicle according to claim 1, wherein
the specific alarm includes a siren sound given from an emergency vehicle and a horn sound given from a general vehicle, and
the processing circuitry analyzes frequency of the sound signals and thereby determines whether the ambient sound includes the specific alarm.

3. The vehicle according to claim 2, wherein
the microphones are set beforehand in multiple positions on the vehicle,
the processing circuitry compares times at which multiple sound signals have been input from the microphones or amplitude levels of the sound signals, and determines a direction from which the detected specific alarm comes, and
the processing circuitry controls the display to change a way of displaying the icon depending on the direction from which the detected specific alarm comes.

4. The vehicle according to claim 2, wherein
priority of displaying the specific alarm is set beforehand depending on alarm types and occurrence situations of the specific alarm, and
when a plurality of the specific alarms have been detected by the processing circuitry, the processing circuitry restricts a number of the icons to be displayed by the display depending on the priority that has been set.

5. The vehicle according to claim 4, wherein
when the specific alarm has a higher priority than a currently displayed alarm, the processing circuitry controls the display to display icons corresponding to the specific alarm having higher priority and erases an icon for the currently displayed alarm.

6. The vehicle according to claim 1, wherein
the display is configured to project the image light toward the windshield of the vehicle via at least one mirror.

7. The vehicle according to claim 6, wherein the display includes:
a first mirror; and
a second mirror, and
the display is configured to project the image light toward the windshield of the vehicle via the first mirror and the second mirror.

8. The vehicle according to claim 7, wherein the display includes a mirror driver configured to drive the second mirror and adjust a display position of the virtual image.

9. The vehicle according to claim 1, wherein
the processing circuitry is configured to determine that the sound signals from the microphone are valid in response to determining that amplitude of the sound signals is at or above a predetermined value.

10. The vehicle according to claim 1, wherein
the processing circuitry is configured to determine that the sound signals from the microphone are valid in response to determining that duration of the sound signals is at or above a predetermined length of time.

11. The vehicle according to claim 1, wherein
the processing circuitry is configured to determine the sound signals from the microphone are valid in response to determining that amplitude of the sound signals is at or above a predetermined value and duration of the sound signals is at or above a predetermined length of time.

* * * * *